(12) United States Patent
Weynant et al.

(10) Patent No.: US 7,490,995 B1
(45) Date of Patent: Feb. 17, 2009

(54) OPTICAL CONNECTOR ASSEMBLY

(75) Inventors: Eric Weynant, Outremont (CA); Laurent Buffard, Lyons (FR)

(73) Assignee: Phasoptx, Montreal, Quebec ( * ) Notice: Subject to any disclaimer, the term of this patent is extended or adjusted under 35 U.S.C. 154(b) by 0 days.

(21) Appl. No.: 11/829,185

(22) Filed: Jul. 27, 2007

(51) Int. Cl.
*G02B 6/38* (2006.01)

(52) U.S. Cl. .............................. 385/72; 385/53; 385/55; 385/70

(58) Field of Classification Search ................... 385/53, 385/55, 70, 72
See application file for complete search history.

(56) References Cited

U.S. PATENT DOCUMENTS

| | | |
|---|---|---|
| 4,461,537 A | 7/1984 | Raymer, II et al. |
| 4,743,084 A | 5/1988 | Manning |
| 4,934,785 A | 6/1990 | Mathis et al. |
| 5,337,390 A | 8/1994 | Henson et al. |
| 5,390,270 A | 2/1995 | Hanzawa et al. |
| 5,703,982 A | 12/1997 | Takizawa |
| 5,737,464 A | 4/1998 | Underwood et al. |
| 5,857,046 A | 1/1999 | Barkus et al. |
| 6,357,933 B1 | 3/2002 | Bradley et al. |
| 6,409,393 B1 | 6/2002 | Grois et al. |
| 6,550,978 B2 | 4/2003 | De Marchi |
| 6,773,167 B2 | 8/2004 | Scanzillo |
| 7,066,656 B2 * | 6/2006 | Demissy et al. ............... 385/55 |
| 2001/0002220 A1 | 5/2001 | Throckmorton et al. |
| 2003/0044124 A1 | 3/2003 | Saitoh |

FOREIGN PATENT DOCUMENTS

| | | |
|---|---|---|
| EP | 0590586 A1 | 4/1994 |
| JP | 63202702 | 8/1988 |
| JP | 2001194554 | 7/2001 |
| WO | 93/21547 | 10/1993 |
| WO | 2005/040876 A1 | 5/2005 |

* cited by examiner

*Primary Examiner*—Jennifer Doan
(74) *Attorney, Agent, or Firm*—Edell, Shapiro & Finnan, LLC (57) ABSTRACT

The present solution relates to a system and method of an optical connector assembly for interconnecting two optical fibers. The optical connector assembly has a splice with a fiber conduit for holding bare ends of the two optical fibers together. Additionally, the optical connector has two corresponding ferrules. The two corresponding ferrules are for securing optical fibers and for aligning the bare end of an optical fiber into the splice without catching an edge. The method includes compressing along the longitudinal axis a first ferrule against the splice to force a guiding member of the first ferrule into a first aperture of the splice, thus opening a conduit of the splice at the first aperture. Once the optic fiber is inserted, the method includes releasing the compression along the longitudinal axis of the first ferrule against the splice to allow the splice to apply radial retention forces on fibers. A sheath to form a connector body of the optical connector assembly interconnects the ferrules.

13 Claims, 8 Drawing Sheets

OPTICAL CONNECTOR ASSEMBLY

FIELD OF THE INVENTION

The present invention relates to the field of optical fiber connectors and in particular, to reusable optical fiber connectors.

BACKGROUND OF THE INVENTION

The current state of the art technology in the field of optical fiber connectors does not make it easy for technicians working in the field to install or repair optical connections. There are generally two types of connectors, namely fusion connectors and mechanical connectors.

In the case of fusion connectors, the two fiber ends to be coupled are mounted in an instrument that allows for the precision alignment of the two fibers adjacent to one another with their respective cores in alignment. At this point, sufficient heat is provided to melt and fuse the cores together. During the fusion process, a number of problems can arise that will result in poor optical connection between the fibers, such as misalignment between the fiber cores as a result of the heating process or even a failure of joining of the two cores during the heating process. The failure rate of making a fiber connection using fusion in the field is often greater than 50%.

In the case of mechanical connectors, it is common in many types of connectors to place the fiber ends in a single "V" groove on a substrate in end-to-end abutment and then to build a packaging around the fibers with the use of optical gels and/or adhesives to complete the connection. When the fibers are not of the same diameter, the alignment of fibers in a groove in a substrate is not good. With conventional mechanical splicing technology, the chances of assembling a successful connection in the field can be about 1 in 3.

A mechanical splice for optical fibers that provides an easier way to connect fibers with greater rates of success than the rate of success associated with the previous state of the art has been developed by the Applicants of the present invention. In U.S. patent application publication 2005/0220418 published on Oct. 6, 2005, based on PCT/CA03/00232 published as WO 2003/071328, there is disclosed a mechanical splice made of shape memory alloy construction having an axial passageway or conduit that is expandable to receive an optical fiber end. The splice can then exert a moderate radial pressure to retain the optical fiber securely centered in the axial passageway and ensure an end-to-end coupling between two optical fiber ends.

Such technology however requires special tooling for opening and closing the axial passageway in order to controllably secure and release the optical fiber ends to provide the desired optical coupling. Examples of instruments adapted to allow the controlled expansion and contraction of the axial passageway in the mechanical splice is known from Applicant's own previous PCT publications, WO 2004/015473 published Feb. 19, 2004 and WO 2005/040876 published May 6, 2005.

SUMMARY OF THE INVENTION

It is an object of the present invention to provide a system and a method for an optical connector assembly using a mechanical splice of the type having an axial conduit adapted to exert a radial retention and alignment force on fiber optic ends in which a special tool or device for controllably causing the axial conduit to expand and contract is not required.

It is a further object of the present invention to provide a system and a method for an optical connector assembly in which precision alignment between the optical fiber and the axial passageway of the mechanical splice is not required.

In accordance with some embodiments of the present invention, there is provided an optical connector assembly for interconnecting two optical fibers and having a splice for holding bare ends of said fibers together while optically coupled, and two corresponding ferrules for securing the fibers to lead into the splice, the ferrules being interconnected by a sheath to form a connector body. In these embodiments, the splice has a first fiber conduit or axial passageway with a first extremity for receiving a first one of the fiber ends and a second extremity for receiving a second one of the fiber ends. The first fiber conduit holds and confines the fiber ends to be in an end-to-end alignment in the first fiber conduit, and the first extremity has at least one aperture. At least one of the ferrules has one or more fiber guiding members adapted to fit within the aperture of the first extremity of the first fiber conduit for aligning the first and second fiber conduits and for guiding the first fiber end into the first fiber conduit without catching an edge.

In other embodiments, the optical connector assembly is provided for interconnecting two optical fibers and has a splice for holding bare ends of the fibers together while optically coupled, and two corresponding ferrules for securing the fibers to lead into the splice. The two ferrules are interconnected by a sheath to form a connector body. In these embodiments, at least one of the ferrules is adapted to engage the mechanical splice with inter-engaging members that allow for mechanical expansion and contraction of a first fiber conduit of the splice by adjusting the position of the ferrule with respect to the splice by a suitable mechanism such as an adjustment nut acting between the sheath.

In another embodiment, once a first fiber optic is placed in the first fiber conduit of the splice, the first ferrule releases exerted compression against the splice forming a first gap between the first ferrule and the splice. To maintain the first gap a spacer is placed between the first ferrule and the splice.

BRIEF DESCRIPTION OF THE DRAWINGS

These and other objects of the present invention will be better understood by way of the following detailed description of a preferred embodiment with reference to the appended drawings in which:

FIG. 4b is a perspective view of the splice of the embodiment of FIG. 4a;

FIG. 5a is a perspective view of a connector without its sheath in which the ferrules mate with the splice using cross shaped tabs and corresponding slots;

FIG. 5b is a perspective view of the splice of the embodiment of FIG. 5a;

FIG. 5c is a perspective view of the ferrule of the embodiment of FIG. 5a;

FIG. 5d is a perspective view of a component in accordance with the embodiment of FIG. 5a.

FIG. 6b is a perspective view of the splice of the embodiment of FIG. 6a;

FIG. 6c is a perspective view of the ferrule of the embodiment of FIG. 6a;

FIG. 6d is a perspective view of a component in accordance with the embodiment of FIG. 6a.

FIG. 7b is a perspective view of the splice of the embodiment of FIG. 7a and a perspective view of the ferrule of the embodiment of FIG. 7a;

FIG. 7c is a perspective view of a component in accordance with the embodiment of FIG. 7a.

DETAILED DESCRIPTION OF EMBODIMENTS OF THE INVENTION

Figure 1:
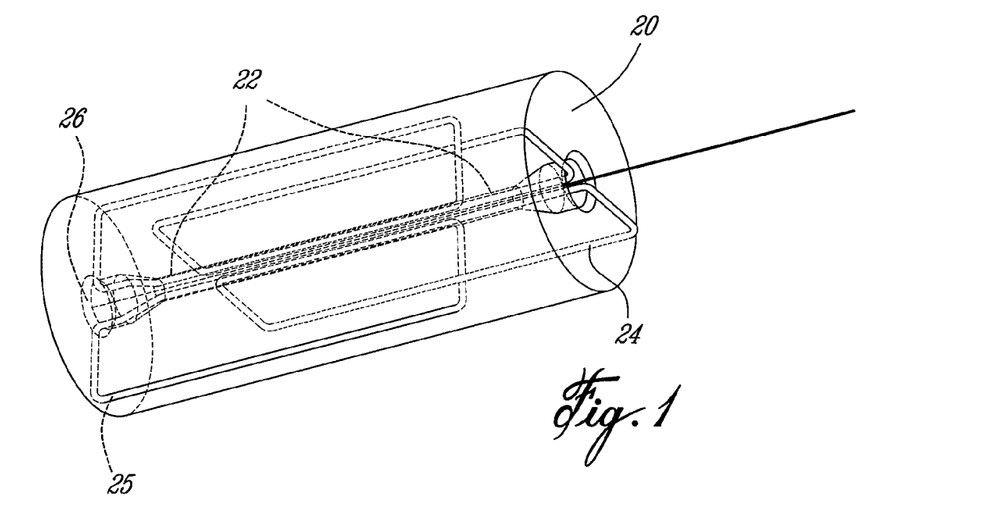
FIG. 1 shows a perspective view of a mechanical splice according to some embodiments of the invention having expansion slots at opposite ends that are at right angles to one another.

With reference to FIG. 1, a mechanical splice (20) has a fiber conduit (22) that is an axial passageway. The splice (20) is made of a shape memory material and has a generally cylindrical construction. The splice (20) may however have other suitable polygonal shapes that may have curved, linear or a combination of curved and linear surfaces. Additionally, the shape of the splice (20) may change along a length of the splice (20). Shape memory materials provide high levels of elasticity, while at the same time, provide the desired levels of rigidity suitable for optic fiber coupling.

It will be appreciated by a person skilled in the art of such materials that a shape memory material suitable for making such a splice can be polymer based, an alloy of copper and aluminum along with a wide variety of other shape memory materials. The essential property for a suitable material to make a mechanical splice that retains fiber ends in a fiber conduit in optical alignment is the ability for the material to expand and contract. With some shape memory materials, it will be appreciated that up to 8-10% deformation can be achieved. When deformations exceed approximately 5%, as is the case for many shape memory alloys, it is possible to use such materials to be controllably expanded and contracted to allow for positioning and securing of fibers in axial alignment in the fiber conduit. Applicants have found that the holding force of such a mechanical splice on a fiber is better than any adhesive and can allow for a fiber to be held and released without damage. Thus, the mechanical splice, as illustrated in FIG. 1, allows for the optical connector assembly to be reusable.

The conical enlargements (26) of the splice (20) as shown in FIG. 1 serve a dual purpose. On the one hand, they allow the splice (20) to receive fiber-guiding members (27) that are cylindrical collar extensions of the ferrules (30a) or (30b) for the purposes of centering the splice (20) vis-à-vis the ferrules and thus guiding the fibers being inserted into the splice (20) from the respective ferrules (30).

The other purpose of the interaction between the conical enlargement (26) and the guiding members (27) is that relative axial displacement between the splice (20) and one of the ferrules (30a) or (30b) will cause an outward radial expansion force to be exerted on the splice (20). The splice (20) is provided with suitable expansion slots (24) or (25), and the displacement action causes the splice (20) to expand under the mechanical force allowing for the fiber to be inserted into the conduit (22).

Figure 4A:
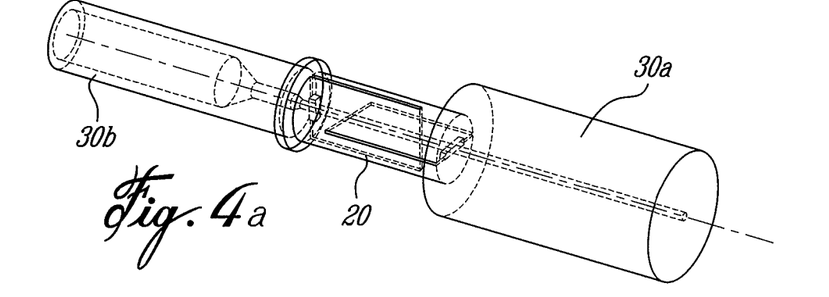
FIG. 4a is a perspective view of a connector without its sheath in which the ferrules mate with the splice using tabs and slots.
Figure 4B:
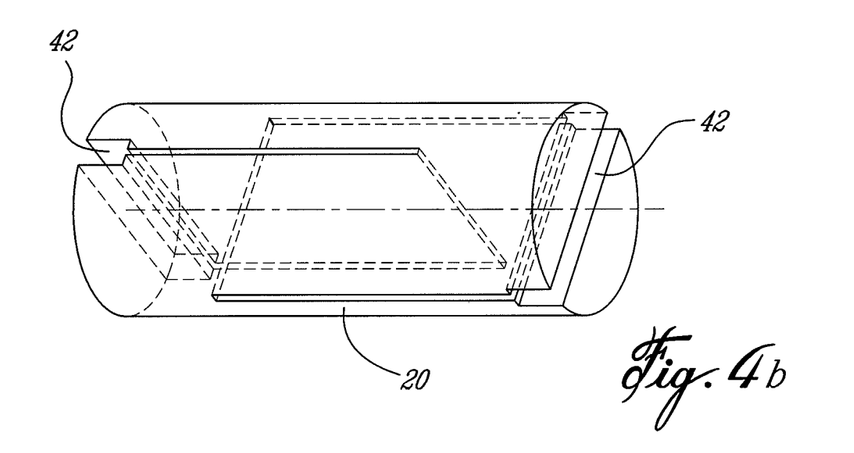
Figure 4C:
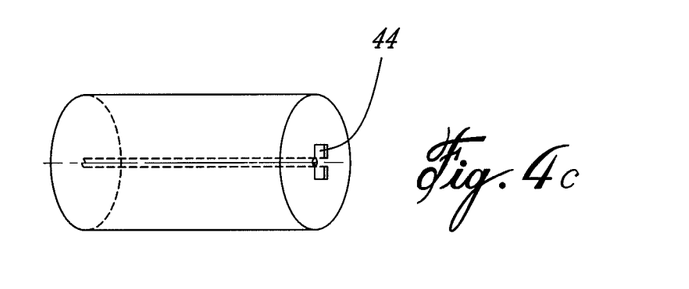
FIGS. 4c and 4d are perspective views of components of a connector assembly.
Figure 4D:
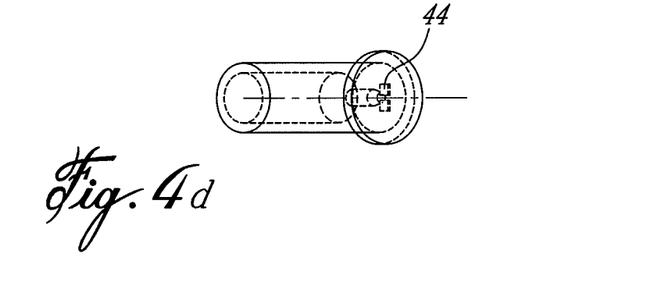

It will be appreciated that the interacting members between the ferrule (30a,30b) and the splice (20) can take different shapes. As shown in FIGS. 4a and 4b, tabs (44) can fit into corresponding channels (42). In this embodiment, the channels (42) provided at the ends of the splice (20) are aligned with the expansion slots (24,25). The channels (42), however, have a greater opening but are not as deep as the expansion slots (24,25). The corresponding tabs (44) of the ferrules (30a, 30b) act as fiber guiding members, while the channels (42) of the splice (20) receive the corresponding tabs (44).

Figures 5A, 5B:
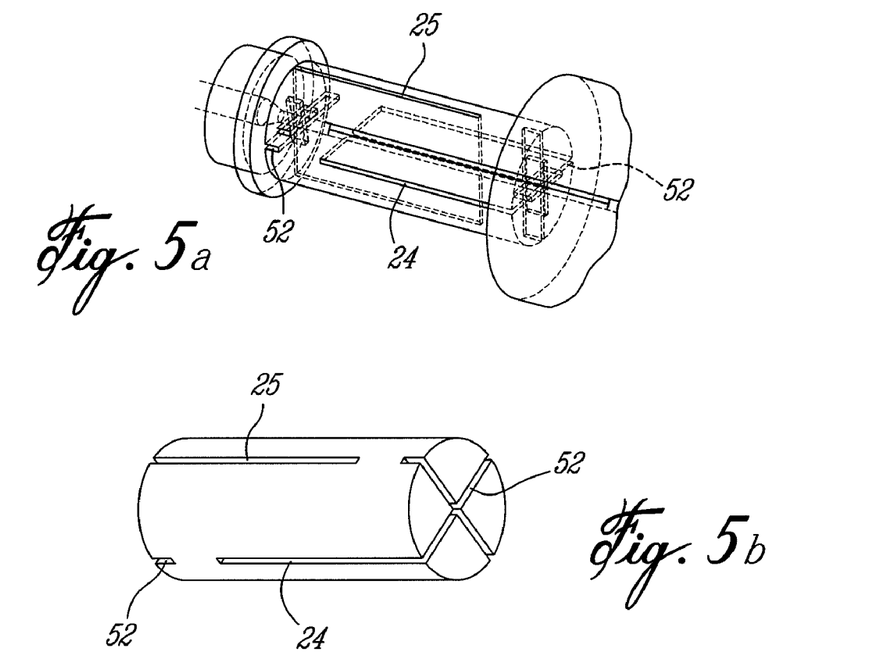
Figure 5C:
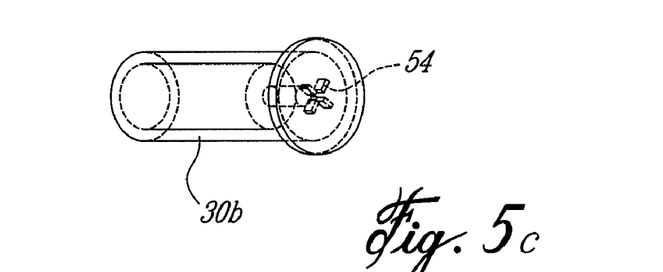
Figure 5D:
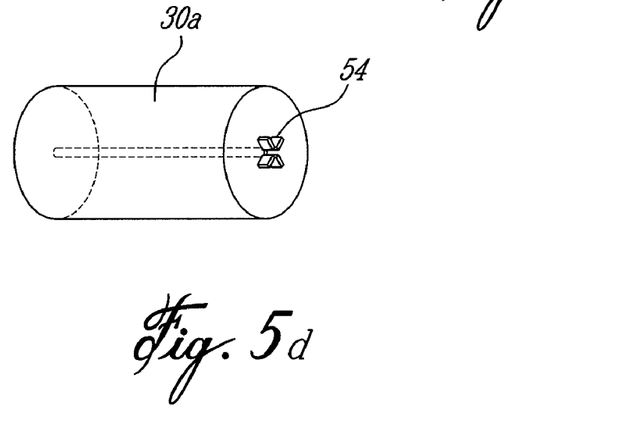

In another embodiment of the system, as presented in FIGS. 5a and 5b, additional slots (52) are provided at the ends of the splice (20) for receiving corresponding tabs of the ferrules (30a, 30b). On each end of the splice (20), the slot (52) having a limited depth and extending across the end surface by passing through its center is provided. The provided slot (52) is at a right angle with the expansion slot (24) or the expansion slot (25). It will be appreciated by a person skilled in the art that the slot (52) may well be at any other suitable angle from the expansion slot (24) and expansion slot (25). In FIG. 5c, the ferrules (30a,30b) are presented with corresponding tabs (54) to the slots (52) on the splice (20). The corresponding tabs (54) are shaped in a cross and do no fully extend across the surface of the end. However, a person skilled in the art will acknowledge that such tabs (54) may fully extend across the end surface of the ferrule (30a, 30b) also. The corresponding tabs (54) of the ferrules (30a, 30b) act as fiber guiding members, while the slots (52) receive the corresponding tabs (54).

Figure 6A:
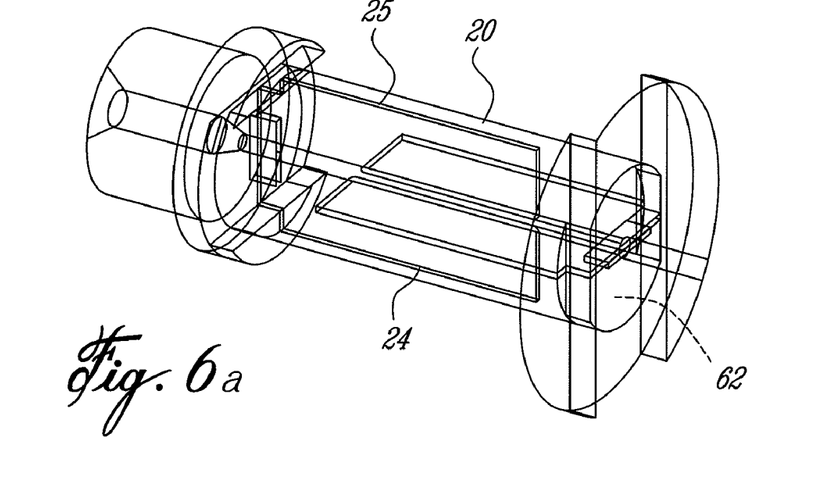
FIG. 6a is a perspective view of a connector without its sheath in which the ferrules mate with the splice using protruding center portions and corresponding channels.
Figure 6B:
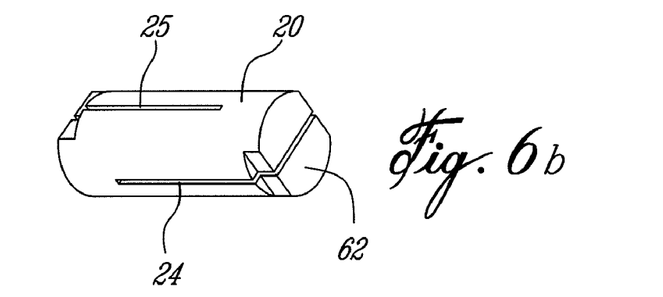
Figure 6C:
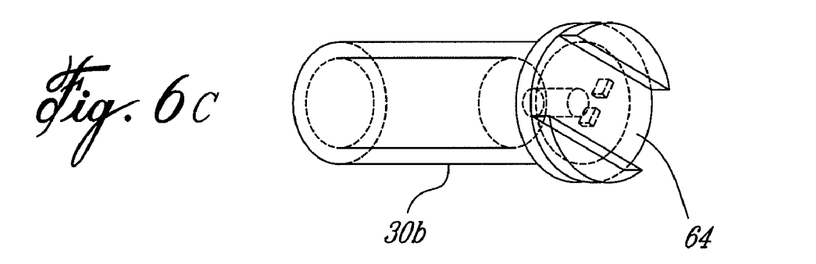
Figure 6D:
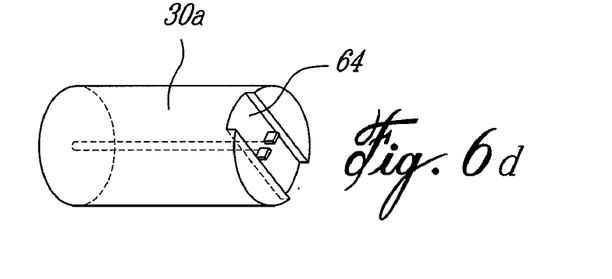

Moreover, in another embodiment of the system, as presented in FIGS. 6a and 6b, a protruding center portion (62) along the expansion slot (24,25) axis is provided at each end of the splice (20). In FIG. 6c, the ferrules (30a, 30b) are presented with corresponding channels (64) to the protruding center portions (62) of the splice (20).

Figure 7A:
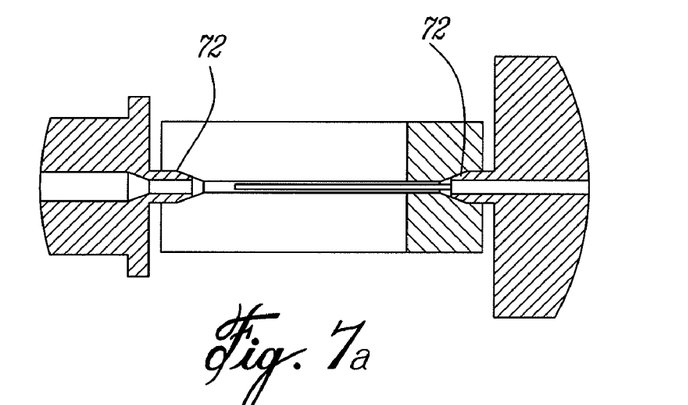
FIG. 7a is a perspective view of a connector without its sheath in which the ferrules mate with the splice using v-shaped channels and corresponding v-shaped tabs.
Figure 7B:
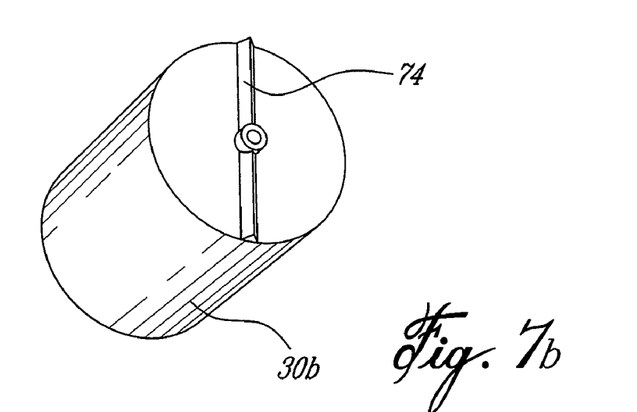
Figure 7C:
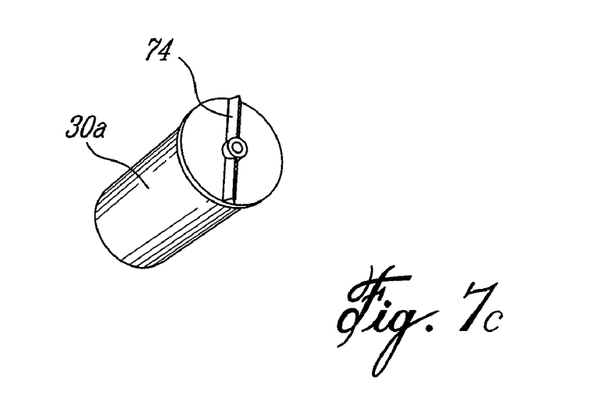

Illustrated in FIG. 7a is another embodiment of the system. In this embodiment, a v-shaped channel (72) along the expansion slot (24,25) axis is provided at each end of the splice (20). In FIG. 7b, the ferrules (30a,30b) are presented with corresponding v-shaped tabs (74) to the corresponding v-shaped channels (72) of the splice (20).

Figure 2:
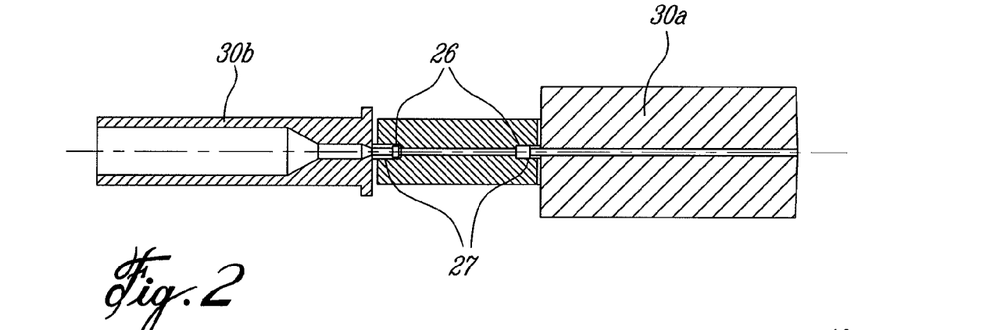
FIG. 2 illustrates a sectional side view of an inter-connection of the splice and the two ferrules in which one ferrule is a cylindrical plug while the other ferrule is of the type adapted to terminate an optical fiber cable.
Figure 3:
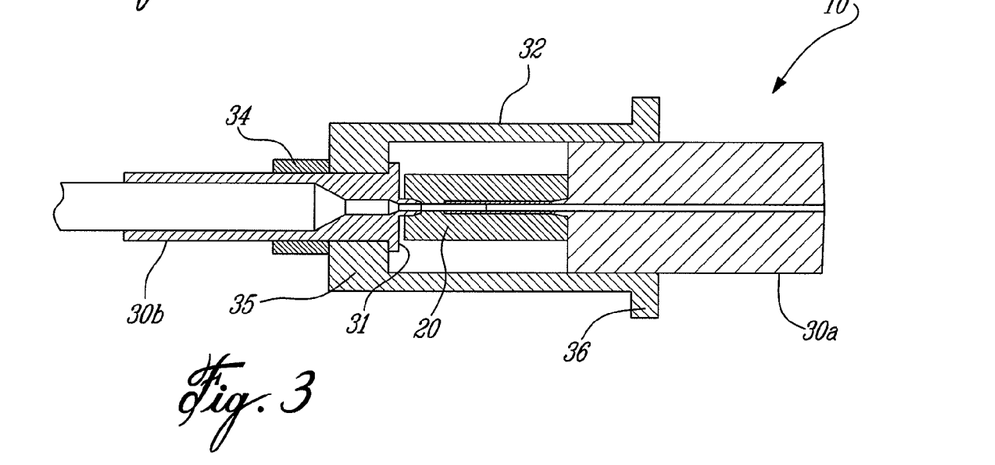
FIG. 3 is a side sectional view of an optical connector assembly having the components of FIG. 2 and including a sheath and axial positioning nut fixing the two ferrules in contact with splice to force all three parts in axial alignment.

In the embodiment illustrated in FIGS. 1, 2 and 3, the axial compression force between the ferrules (30) and the splice (20) is symmetrical with the intent to either expand or contract the fiber conduit (22) symmetrically. However, it will be appreciated that in some cases it may be desirable to expand the splice at one end only with the effect of leaving an optical fiber at an opposite end secured in the fiber conduit while the fiber may be freely inserted up to a point of abutment and optical alignment from the end at which the expansion force is generated.

It will also be appreciated that in the case of some shape memory materials, the application of certain temperatures may cause the material to expand or contract as desired in order to allow the fiber ends to be positioned into optical alignment and then held in the fiber conduit with sufficient radial force to retain the fibers in optical alignment.

FIG. 3 illustrates one common type of connector, namely a cable to optical plug. It will be appreciated that the connector can be for connecting in a variety of configurations, such as cable to cable, an optical device to a cable, an optical plug to a socket, etc.

As shown in FIG. 3, a sheath (32) interconnects the ferrule (30b) and the ferrule (30a). The sheath has adaptations for connecting to the ferrule (30b), namely a flange abutment (35), while at its end near ferrule (30a), an outwardly extending flange (36) is provided that forms a limit abutment for the cylindrical optical connector plug provided by ferrule (30a). It will be appreciated that the plug (30a) may include a further larger circumference shroud or other type of mating member that forms part of an optical plug-in socket arrangement. The axial retention nut (34) may be mounted onto the sleeve of ferrule (30b) by threads (not shown) that allow rotation of the nut (34) to exert or secure the ferrule (30b) in the position illustrated in FIG. 3.

To assemble the optical connector assembly as illustrated in FIG. 3, a user places ferrule (30b) into sheath (32) until flanges (31) and flange abutment (35) meet. Then splice (20) is positioned on the ferrule (30b) with the conical enlargement (26) fitting over the fiber guiding member (27). The ferrule (30a) is inserted into the sheath (32) to engage the splice (20). By pressing the ferrule (30a) against the sheath (32), the splice (20) is caused to open. In this position, a fiber piece can be inserted into the conduit of the ferrule (30a) into the middle of the splice (20). The pressing action is then released. This piece of fiber is then held in the conduit of the ferrule (30a) and its exposed end is polished to be flush with the outside surface of the ferrule (30a).

By loosening the retention nut (34), the ferrule (30b) can be used to exert an axial force on the splice (20), and cause the conduit (22) to open. A fiber cable with a short length of its fiber exposed is inserted into the ferrule (30b) until the fiber end from the cable abuts in the splice (20) the end of the piece of fiber now solid with the ferrule (30a). The axial force is released and the optical coupling can be tested. If the optical coupling between the cable and the ferrule (30a) is sound, then the retention nut (34) can be tightened.

It will be appreciated that the assembly shown in FIG. 3 may be pre-assembled with the optical fiber secured and polished in ferrule (30a) leaving only the fiber cable to be inserted in ferrule (30b). In the field, the fiber cable is prepared and inserted into the assembly as described above. Should the fiber cable ever need to be repaired or replaced, the nut (34) can be released and then axial pressure can be exerted on the splice (20) using the ferrule (30b), and the fiber cable can be released from the ferrule (30b) and replaced with a new cable.

Figure 8A:
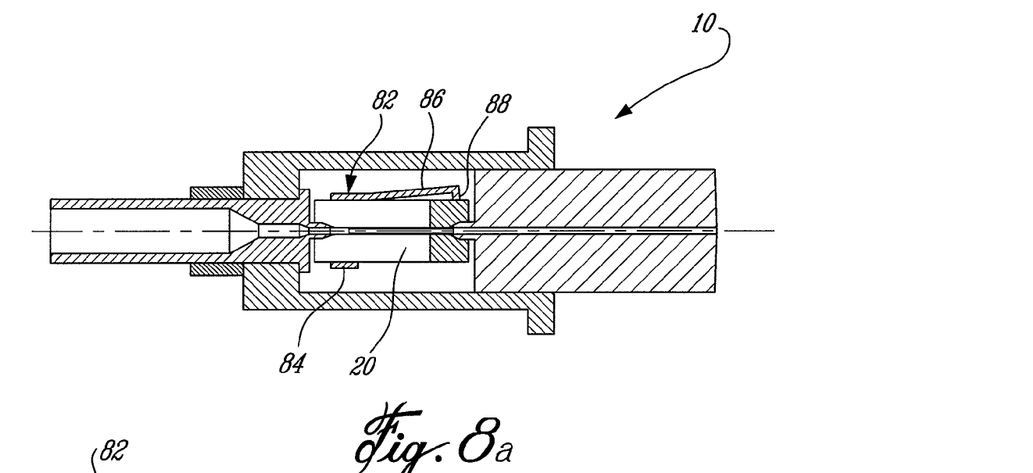
FIGS. 8a and 8b are perspective views of a spacer to secure the splice in place and a side sectional view of an optical connector assembly having the spacer slipped over the splice.
Figures 8B, 9:
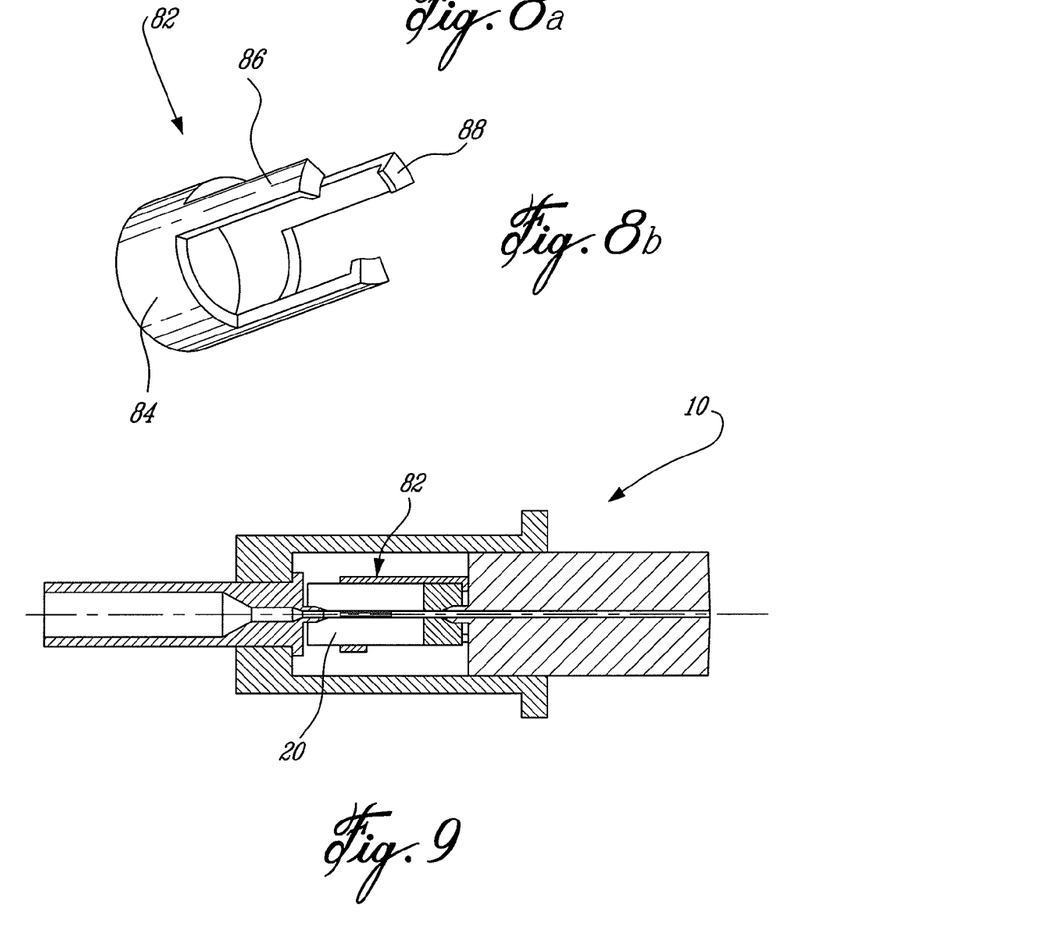
FIG. 9 is a side sectional view of an optical connector assembly having the spacer moved into position to secure the splice in place.

In another embodiment, a space (82) is provided to secure the splice (20) in place, once the optical connector is assembled, as illustrated in FIGS. 8 and 9. The spacer (82) is made of a collar (84) with extending fingers (86) that have spacing ends (88). Although the spacer (82) requires at least one extending finger (86), a person skilled in the art will understand that additional extending fingers (86) can be provided. The spacer (82) has a shorter length and has a slightly larger collar (84) opening then the splice (20) as to be slipped over the splice (20) when placed in the sheath (30) as shown in FIG. 8.

During the assembly of the optical connector, when the ferrule (30a) is inserted into the sheath (32) to engage the splice (20). By pressing the ferrule (30a) against the sheath (30), the splice (20) is caused to open. The extending fingers (86) of the spacer (82) open up as well. Once the fiber piece is inserted into the conduit of the ferrule (30a) up to the middle of the splice (20), the compression action against the splice (20) is released. The spacer (82) is moved along the splice (20) towards the ferrule (30a) as so the spacing ends (88) clip between the end of the splice (20) and the end of the ferrule (30a) as presented in FIG. 9. The spacer (82) is moved into position with rods from the outside passing through the sheath (32). The rods are removed once the spacer (82) is placed in position.

Figure 10A:
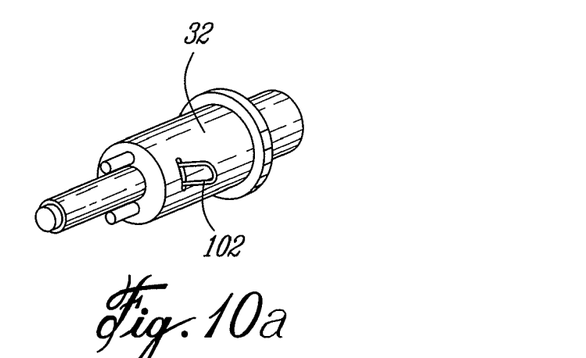
FIG. 10a is a perspective view of an optical connector with a pin placed through the body of the sheath, in between the splice and the ferrule.
Figure 10B:
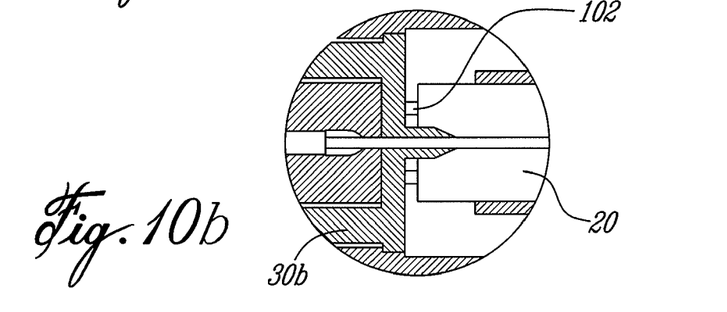
FIG. 10b is a side sectional view of a portion of an optical connector having a pin between the splice and the ferrule.

The spacer (82), once in place, prevents the ferrule (30a) from causing the conduit of the splice (20) to open. Similarly, to prevent the ferrule (30b) from causing the conduit of the slice (20) to open, presented in FIGS. 10a and 10b is a pin 102. The pin 102 is placed through the body of the sheath (32) between the splice (20) and the ferrule (30b).

Figure 11:
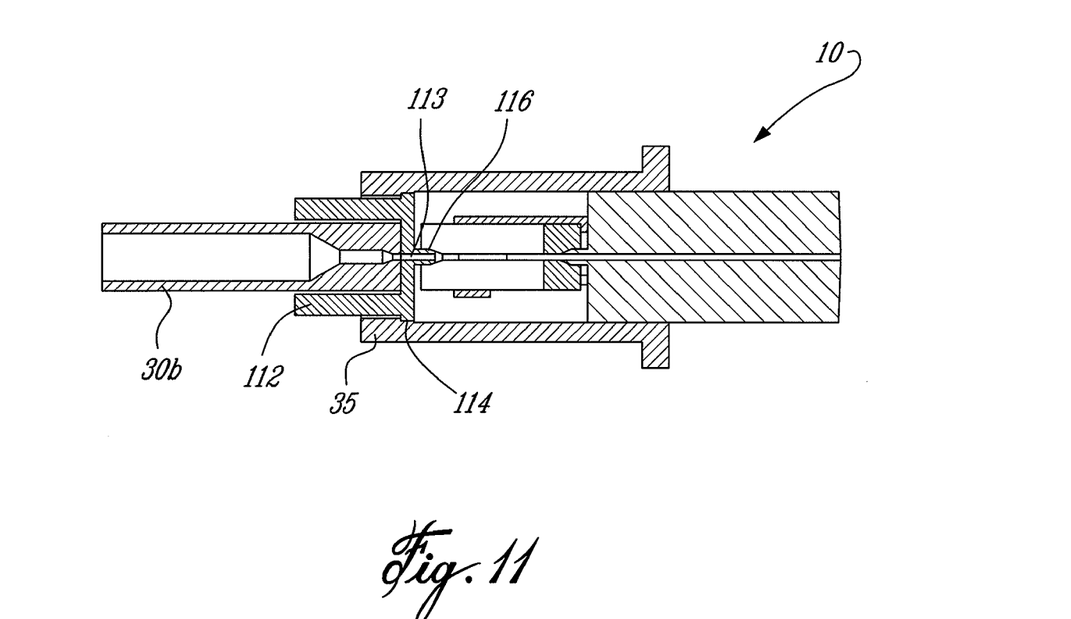
FIG. 11 is a side sectional view of an optical connector assembly having a clamp with flange abutment to secure the ferrule.

In another embodiment of the system, as presented in FIG. 11, to secure the ferrule (30b) in place, a clamp (112) with a fiber conduit (113) is provided as an interface between the ferrule (30b) and the splice (20). The clamp (112) has flanges (114) that hold the clamp (112) in place within the flange abutment (35) of the sheath (32). Moreover, the clamp (112) has a fiber guiding member (116) that fits into the conical enlargement (26) of the splice (20).

Figure 12:
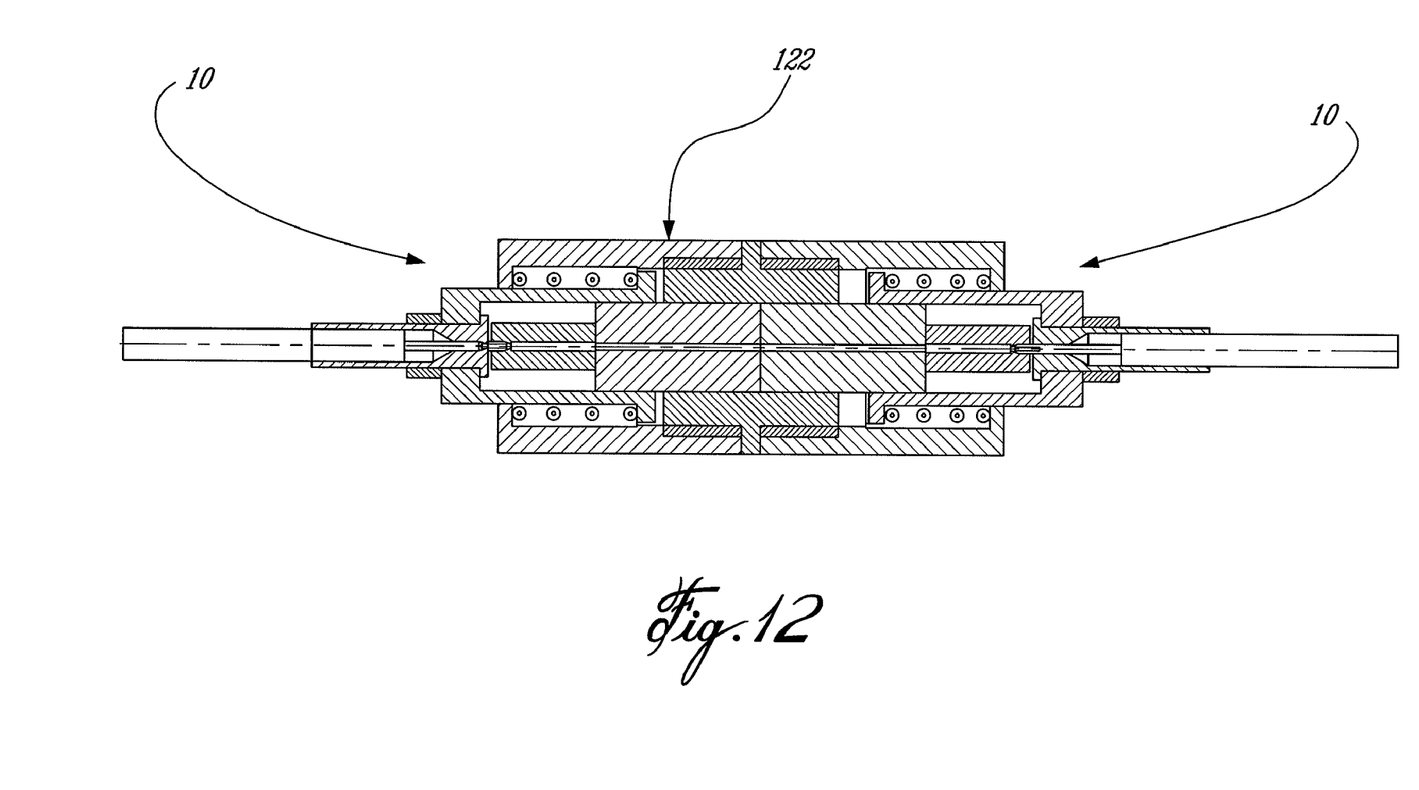
FIG. 12 is a side sectional view of an adaptor connecting two optical connectors.

Presented in FIG. 12, is an illustration of how two optical connectors (10) are connected together in an adapter (122). The fiber conduit of both ferules (30b) are aligned to allow fiber optic signals to pass.

The invention claimed is:

1. An optical connector assembly for interconnecting two optical fibers and having a splice for holding bare ends of said fibers together while optically coupled, and two corresponding ferrules for securing said fibers to lead into said splice, said ferrules being interconnected by a sheath to form a connector body, wherein:

said splice comprises a first fiber conduit with a first extremity for receiving a first one of said fiber ends and a second extremity for receiving a second one of said fiber ends, where said first fiber conduit holds and confines said fiber ends to be in end to end alignment in said first fiber conduit, where said first extremity comprises at least one aperture; and a first one of said ferrules comprising at least one fiber guiding member adapted to fit within said at least one aperture of said first extremity of said first fiber conduit for aligning said first and second fiber conduits and for guiding said first fiber end into said first fiber conduit without catching an edge, wherein said at least one fiber guiding member comprises a projection, and said at least one aperture comprises an enlargement of said first fiber conduit.

2. The optical connector assembly as claimed in claim 1, wherein said projection and said aperture cooperate to exert a separation force on said first extremity, said splice comprising a slot to allow for expansion of said first fiber conduit at said first extremity through axial displacement between said projection and said aperture.

3. The optical connector assembly as claimed in claim 1, wherein said projection is an annular projection.

4. The optical connector assembly as claimed in claim 2, further comprises at least one spacer between said splice and said opposing ferrule for preventing said axial displacement.

5. The optical connector assembly as claimed in claim 4, wherein said spacer is supported by said splice.

6. The optical connector assembly as claimed in claim 4, wherein said spacer is supported by said sheath.

7. The optical connector assembly as claimed in claim 5, wherein said spacer is a collar with extending fingers with spacing ends that is slipped along the splice and clipped between said ferrule and said splice.

8. The optical connector assembly as claimed in claim 6, wherein said spacer is a pin that is slipped through from an outer side along a radial of said sheath and lodged between said ferrule and splice.

9. The optical connector assembly as claimed in claim 1, wherein said ferrule is secured to said sheath with at least one attachment.

10. The optical connector assembly as claimed in claim 9, wherein said at least one attachment is an axial positioning nut that is displaced along the ferrule against an outer side of said sheath.

11. The optical connector assembly as claimed in claim 1, wherein said splice is made of shape memory alloy.

12. A method for assembling an optical connector comprising:
   aligning a first aperture of a splice over corresponding projection of a first ferrule;
   compressing along a longitudinal axis said first ferrule against said splice to force projection of said first ferrule into said first aperture of said splice, thus opening a conduit of said splice at said first aperture;
   inserting an optic fiber through a conduit of said first ferrule, through said first aperture of said splice and into said conduit of said splice;
   releasing compression along a longitudinal axis of said first ferrule against said splice to allow said splice to apply radial retention forces on said fiber;
   aligning a projection of a second ferrule with corresponding second aperture of said splice;
   compressing along a longitudinal axis said second ferrule against said splice to force said projection of said second ferrule into said second aperture of said splice, thus opening said conduit of said splice at said second aperture;
   inserting an optic fiber through a conduit of said second ferrule, through said second aperture of said splice and into said conduit of said splice; and
   releasing compression along a longitudinal axis of said second ferrule against said splice to allow said splice to apply radial retention forces on said fiber,
   wherein said releasing provides a first gap between said splice and said first ferrule, a spacer is placed between said first ferrule and said splice to maintain said first gap when compressing said second ferrule against said splice.

13. The method of claim 12 wherein said aligning is done once said splice is placed in a sheath to which said first ferrule is attached.

* * * * *